United States Patent
Printezis

(10) Patent No.: US 7,441,201 B1
(45) Date of Patent: Oct. 21, 2008

(54) METHOD FOR PLACING GRAPHICAL USER INTERFACE COMPONENTS IN THREE DIMENSIONS

(75) Inventor: Antonios Printezis, Burlington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 542 days.

(21) Appl. No.: 10/968,690

(22) Filed: Oct. 19, 2004

(51) Int. Cl.
*G06F 3/00* (2006.01)

(52) U.S. Cl. .................. 715/762; 715/848; 715/964

(58) Field of Classification Search .......... 715/848, 715/765, 778, 762, 782, 850, 866
See application file for complete search history.

(56) References Cited

U.S. PATENT DOCUMENTS

| | | | |
|---|---|---|---|
| 6,597,358 B2 * | 7/2003 | Miller ................... 345/427 |
| 7,062,722 B1 * | 6/2006 | Carlin et al. ................ 715/850 |
| 7,246,044 B2 * | 7/2007 | Imamura et al. ............. 703/1 |
| 2003/0071810 A1 * | 4/2003 | Shoov et al. ................ 345/420 |
| 2003/0128242 A1 * | 7/2003 | Gordon ...................... 345/848 |
| 2004/0113945 A1 * | 6/2004 | Park et al. .................. 345/765 |
| 2004/0225968 A1 * | 11/2004 | Look et al. .................. 715/778 |
| 2004/0236561 A1 * | 11/2004 | Smith et al. ................. 703/22 |
| 2005/0081161 A1 * | 4/2005 | MacInnes et al. ........... 715/765 |
| 2005/0168459 A1 * | 8/2005 | Baird ......................... 345/419 |

* cited by examiner

*Primary Examiner*—Stephen Hong
*Assistant Examiner*—Omar Abdul-Ali
(74) *Attorney, Agent, or Firm*—Osha • Liang LLP

(57) ABSTRACT

A method for creating a three-dimensional (3D) graphical user interface (GUI) involves creating a first two-dimensional (2D) container and a second 2D container, and placing the first 2D container and the second 2D container in a 3D environment to create the 3D GUI, wherein the orientation of the first 2D container in the 3D environment and the orientation of the second 2D container in the 3D environment are set prior to run time.

25 Claims, 5 Drawing Sheets

METHOD FOR PLACING GRAPHICAL USER INTERFACE COMPONENTS IN THREE DIMENSIONS

BACKGROUND

A typical computer system includes an operating system which is responsible for allocating the system resources, including the processor, memory, monitor, etc. The operating system manages all of the interactions with a user, including the output of data to the monitor and the input from the keyboard, mouse, or other input device. A user may interact with the operating system in one of three ways: a command-line interface, a two-dimensional (2D) graphical user interface (GUI), or a three-dimensional (3D) graphical user interface.

The command-line interface (or text-based interface) allows the user to interact with the computer by typing commands using a keyboard. For example, the Unix operating system is a command-line operating system that requires only a keyboard to manipulate and perform various commands, functions, etc. Specifically, a user can navigate through the directory structure by typing commands followed by options, expressions, directories, or filenames. For example, to change directories, the user may type the command cd (i.e., "change directory") followed by the desired directory name to enter.

A 2D GUI allows the user to interact with the computer using a keyboard and/or a mouse. The Solaris™ operating system (Solaris is a trademark of Sun Microsystems, Inc., Santa Clara, Calif., USA) for example, uses an X Windows System™ (X Windows System is a trademark of The Open Group, San Francisco, Calif., USA) toolkit which provides 2D GUI facilities that allow users to navigate using a keyboard and a mouse. Specifically, a 2D GUI is a user interface based on graphics (icons, pictures, menus, etc.). Typically, in a 2D GUI environment, all of the graphics are either two-dimensional objects or pseudo three-dimensional objects, which may be implemented with the use of clever drawing techniques. For example, in this environment, a user may enter a directory by double clicking the mouse on an icon in the shape of a folder.

2D GUI Toolkits have been created to help minimize the time a programmer spends creating a GUI application. Motif™ (Motif is a trademark of Open Software Foundation, Inc., Cambridge, Mass., USA), Swing (Swing is a product of Sun Microsystems, Inc., Santa Clara, Calif., USA), and Qt® (Qt is a registered trademark of Trolltech, Inc., Santa Clara, Calif., USA) are all examples of widely used 2D GUI Toolkits. 2D GUI Toolkits provide a set of basic building elements (e.g., GUI components such as buttons, menus, text boxes, etc.) and facilitate the creation of a GUI using these elements.

With the improvement in graphics technology, computer systems today often include a 3D graphics card. Because 3D graphics cards are becoming a standard feature in personal computer systems, 3D graphical environments are being created to take advantage of the powerful hardware and bring 3D windowing technologies to the desktop.

3D graphical environments allow a 2D GUI application to run in a 3D environment by mapping the window containing the 2D application in three dimensions and adding a depth to the window. In some cases, mapping of the window takes place during run time. Accordingly, the manner in which the 2D application is displayed is dependent on the underlying 3D environment.

SUMMARY

In general, in one aspect, the invention relates to a method for creating a three-dimensional (3D) graphical user interface (GUI), comprising creating a first two-dimensional (2D) container and a second 2D container, and placing the first 2D container and the second 2D container in a 3D environment to create the 3D GUI, wherein the orientation of the first 2D container in the 3D environment and the orientation of the second 2D container in the 3D environment are set prior to run time.

In general, in one aspect, the invention relates to a computer readable medium comprising software instructions to create a 3D GUI, wherein the software instructions comprise functionality to create a first 2D container and a second 2D container, place the first 2D container and the second 2D container in a 3D environment to create the 3D GUI, wherein the orientation of the first 2D container in the 3D environment and the orientation of the second 2D container in the 3D environment are set prior to run time.

In general, in one aspect, the invention relates to a computer system comprising a processor, a memory, a storage device, and software instructions stored in the memory for enabling the computer system under control of the processor to create a first 2D container and a second 2D container, place the first 2D container and the second 2D container in a 3D environment to create a 3D GUI, wherein the orientation of the first 2D container in the 3D environment and the orientation of the second 2D container in the 3D environment are set prior to run time.

Other aspects of the invention will be apparent from the following description and the appended claims.

DETAILED DESCRIPTION

Figure 1:
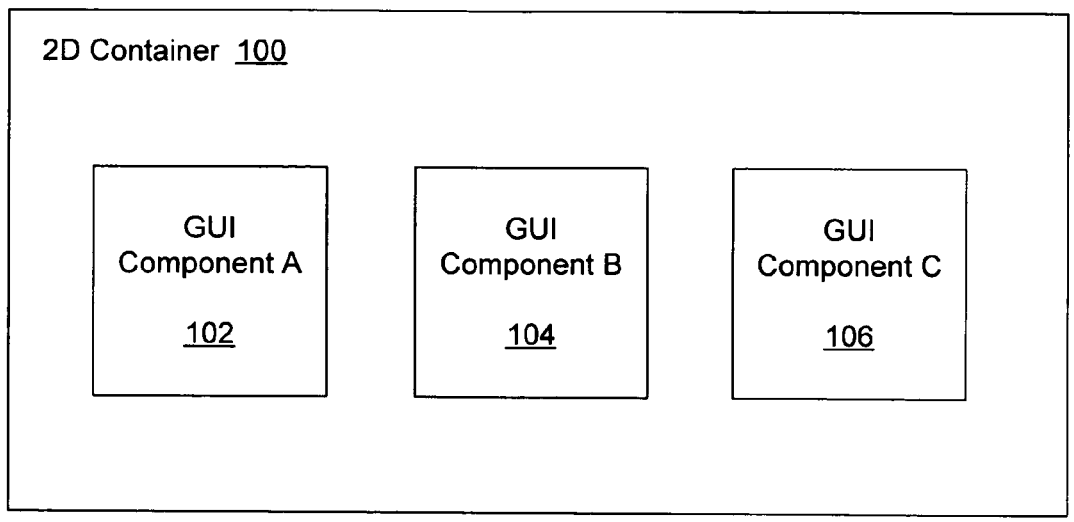
FIG. 1 illustrates GUI components placed inside a 2D container, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to a method for creating a 3D GUI. Specifically, the application programmer may select the placement of GUI components in a 2D container and 2D containers in a 3D environment to create a 3D GUI. Further, the application programmer may implement constraints (2D and 3D constraints) to manage the modification (e.g., reshaping, resizing, moving, etc.) of GUI components and 2D containers. Specifically, the application programmer will determine how the 3D GUI will appear in the 3D environment before the program has begun execution (e.g., prior to run time).

FIG. 1 illustrates a 2D container (100) with three GUI components (e.g., GUI component A (102), GUI component B (104), GUI component C (106), etc.) positioned inside of the 2D container (100), in accordance with one embodiment of the invention. A GUI component (e.g., GUI component A (102), GUI component B (104), GUI component C (106), etc.) is any graphical element (e.g., a menu, a button, a text box, etc.) used to build a graphical user interface. The purpose of a 2D container (100) is to provide an area that may contain GUI components. A person of ordinary skill in the art can appreciate that while the illustration in FIG. 1 depicts three GUI components within a 2D container, a 2D container may contain more or less GUI components. The application programmer may place GUI components anywhere within a 2D container (100). While the shape of the 2D container (100) in FIG. 1 is a square, the shape of a 2D container (100) is not limited to a square. In fact, the shape of a 2D container (100) may be any 2D shape (e.g., octagon, triangle, hexagon, etc.).

The user may modify GUI components (102, 104, 106) within a 2D container (100). To allow such modification, the application programmer defines a set of 2D constraints which determine how a GUI component behaves when another GUI component within the same 2D container (100) is modified or the 2D container (100) itself is modified. For example, if a user seeks to enlarge GUI component A (102), then the application programmer would need to define how GUI components B (104) and C (106) behave when GUI component A (102) is enlarged. If a user seeks to enlarge the 2D container (100), then the application programmer would need to define how GUI components A (102), B (104), and C (106) behave when the 2D container (100) is enlarged.

Many schemes can be implemented to determine how a GUI component (102, 104, 106) may behave when another GUI component (102, 104, 106) within the same 2D container (100) is modified or the 2D container (100) itself is modified. In one such scheme, each GUI component (102, 104, 106) arranged in a horizontal row or vertical column may be equally spaced throughout the entire row or column.

Figure 2:
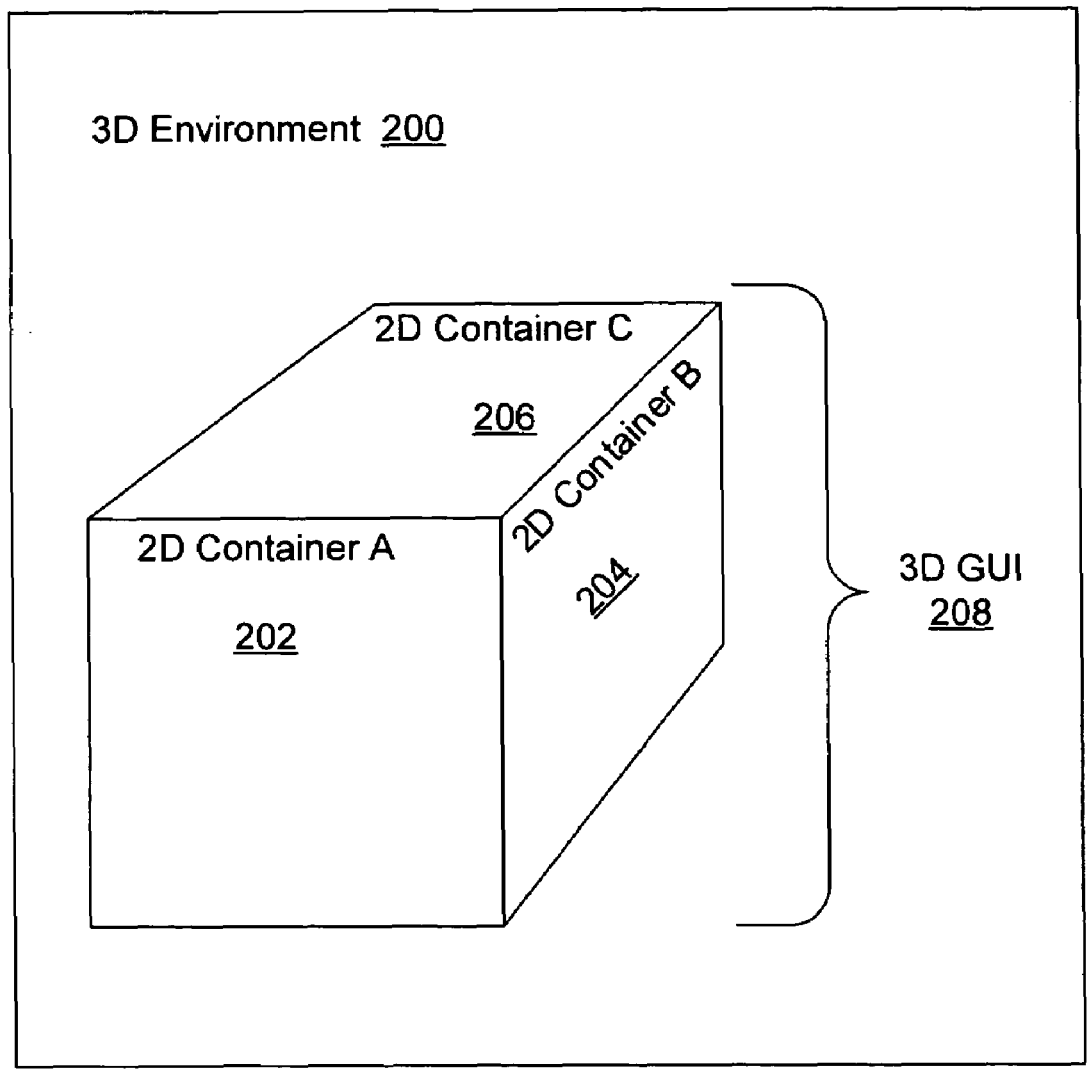
FIG. 2 illustrates 2D containers placed inside a 3D environment to create a 3D GUI, in accordance with one or more embodiments of the invention.

FIG. 2 illustrates a 3D environment (200) in which a 3D GUI (208) has been created. Specifically, a 3D GUI (208) has been created from several independent 2D containers (e.g., 2D container A (202), 2D container B (204), 2D container C (206), etc.). A 3D environment (200) allows the creation of 3D objects (e.g., a 3D GUI (208), 3D images, etc.) in 3D space. The 3D environment may provide a coordinate system, such as a 3D Cartesian coordinate system or rotational coordinate system, to map the 3D objects in 3D space. In one embodiment of the invention, the 3D environment may appear on a 2D surface (e.g., on a computer monitor, etc.) or in a 3D representation (e.g., a hologram, etc.).

FIG. 2 depicts a 3D GUI (208) in the shape of a box, however, a person of ordinary skill in the art can appreciate that a 3D GUI (208) is not limited to the shape of a box, and the 3D GUI (208) may have any three-dimensional shape (e.g., pyramid, 3D pentagon, etc.). Also, the 2D containers, as illustrated, have shared edges, however, the 2D containers are not required to have shared edges to create a 3D GUI (208). Further, FIG. 2 depicts the 2D containers in the shape of a rectangle, however a 2D container is not limited to the shape of a rectangle; a 2D container, as mentioned above, may have any two-dimensional shape.

In one embodiment of the invention, software code may be created to place 2D containers into a 3D environment (200). The software code may be in the form of a function that places a 2D container into a 3D environment (200). In one embodiment of the invention, the function may require the application programmer to provide the necessary three-dimensional Cartesian coordinates (e.g., the corners of a 2D container) in order to properly place the 2D container into a 3D environment. A person of ordinary skill in the art would appreciate that many other implementations of a software code may be possible to place a 2D container into the 3D environment (e.g., using the rotational coordinate system, using matrices to record the locations of the 2D containers, using a graphical program to place 2D containers in a 3D environment using a mouse, etc.).

The 2D containers may be placed in the 3D environment to form a 3D GUI (208). Further, a set of 3D constraints may be defined to allow the 2D containers that form the 3D GUI (208) to be modified together. For example, if the 3D GUI (208) depicted is a box, then when one 2D container is expanded on one axis, the three other 2D containers with shared edges may also expand to maintain the box shape.

The software code to define the 3D constraints may be in the form of a function. In one embodiment, the function may require the application programmer to provide the 3D Cartesian coordinates of the 2D container that the 3D constraints will apply. A person of ordinary skill in the art would appreciate that many other implementations using various sorts of software code may be possible to define the 3D constraints (e.g., using the rotational coordinate system, using matrices to track which 2D containers are effected, using a graphical program to select the 2D containers, etc.). Further, because 3D constraints may be defined for several 2D containers in a group, modification of one 2D container may have an effect on the other 2D containers.

Figure 3:
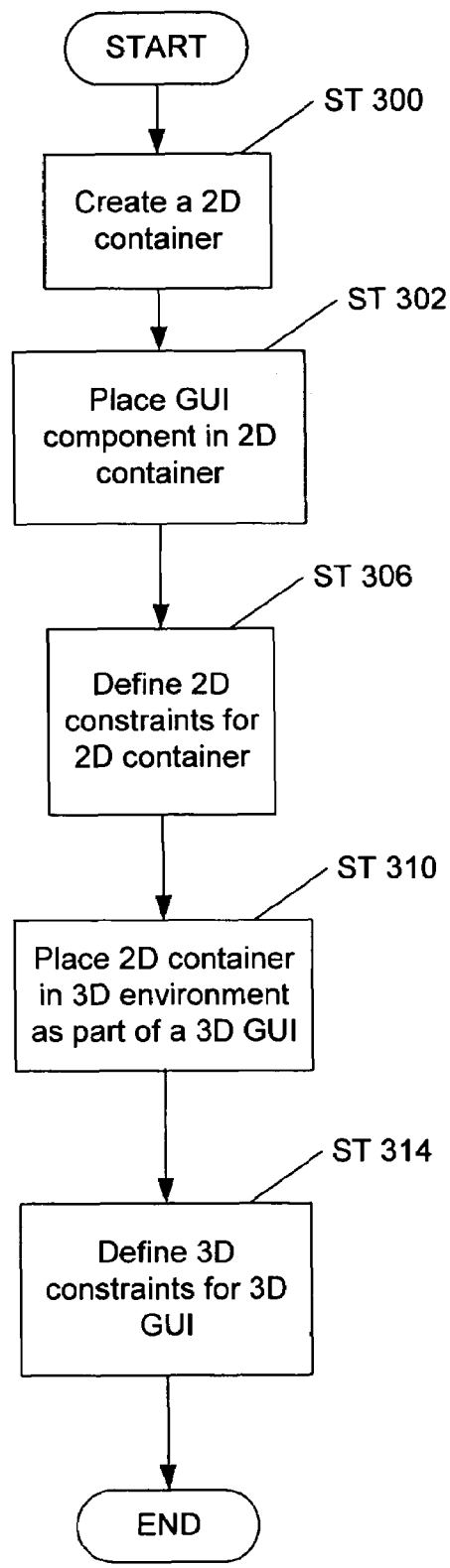
FIG. 3 illustrates a flowchart for a method to create a 3D GUI, in accordance with one or more embodiments of the invention.

FIG. 3 illustrates a method for creating a 3D GUI in accordance with one embodiment of the invention, specifically, a 3D GUI that is created from a set of 2D containers. First, an application programmer may create a 2D container (ST 300). As discussed above when describing FIG. 1, the 2D container may be any two-dimensional shape. Further, a 2D container may contain GUI components.

Next, an application programmer chooses one or more GUI components and places them in the 2D container (ST 302). The application programmer defines a set of 2D constraints (as discussed above) (ST 306). The application programmer may place each 2D container into a 3D environment (ST 310).

Specifically, as discussed above, software code (i.e., software instructions, a construct within a programming language, etc.) may be created to assist with the placement of 2D containers into a 3D environment. The software code may be in the form of a function to place a 2D container into a 3D environment. Using the provided function, an application programmer may choose exactly where to place each 2D container in the 3D environment. The application programmer arranges the set of 2D containers to form a 3D GUI.

The application programmer may define a set of 3D constraints (ST 314) that define how the 3D GUI may be modified. The 3D constraints allow the 3D GUI to be modified as one unit instead of separate 2D containers. For example, in one embodiment of the invention, if the 2D containers are arranged to form a box, and the adjacent edges are constrained together, modifying one face of the box would affect other faces of the box. Specifically, if one 2D container were elongated, the corresponding edges (the parallel edges to the elongated edge) of each 2D container, as defined be the 3D constraints, would also be elongated. The application programmer may continue to create individual 2D containers, place GUI components in the 2D container, define the 2D constraints for each 2D container, place the 2D container in the 3D environment, and define the 3D constraints for each 2D container as necessary until the 3D GUI has been constructed (e.g., repeat steps 300-314 to create a 3D GUI).

A person of ordinary skill in the art will appreciate that while the example describes a 3D GUI as box-shaped, a 3D GUI may be any 3D shape (e.g., box, cube, pyramid, etc.). Also, the example describes a 2D container being modified such that it is elongated, however, the process of modifying is not limited to elongation but may also include such operations as stretching, compressing, moving, rotating, etc. In addition, the method described in FIG. 3 specifies a particular ordering of the steps involved. However, the method described above is one embodiment of the invention; in another embodiment of the invention, the steps described may occur in a different order. For example, the 2D containers may be placed in the 3D environment before any 2D components have been placed in the 2D container.

Figure 4:
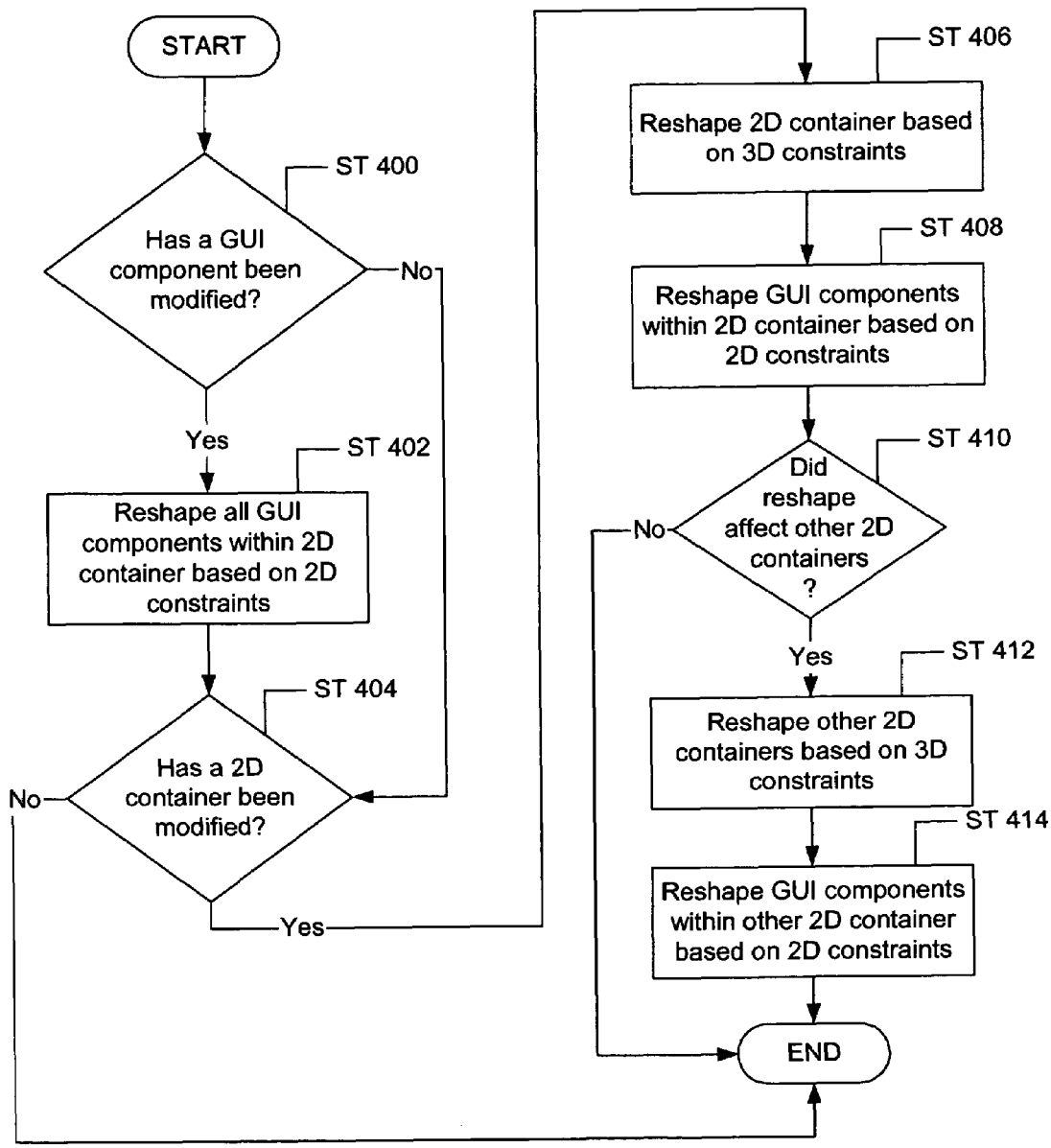
FIG. 4 illustrates a flowchart for a method to modify a 3D GUI, in accordance with one or more embodiments of the invention.

FIG. 4 illustrates a method to modify a 3D GUI in accordance with one embodiment of the invention. After a 3D GUI has been created (e.g., laid out, and (2D and 3D) constraints are defined), the user may interact with the 3D GUI to modify the 3D GUI in several ways. First, the user may modify a GUI component (e.g., text box, button, etc.). Second, the user may modify the 3D GUI itself (by modifying a 2D container that makes up the 3D GUI).

The process to modify a 3D GUI starts by detecting whether a GUI component has been modified (ST 400). Because several GUI components may be placed in the same 2D container, modification of one GUI component may affect the size, shape, location, orientation, etc. of other GUI components within the same 2D container. Specifically, if a GUI component has been modified, the 2D constraints (as discussed above) are applied and the affected GUI components are modified (ST 402). Further, modification of one GUI component may affect the size, shape, location, orientation, etc. of the 2D container in which the GUI component is contained.

The next step is to detect whether a 2D container has been modified (ST 404). Because several 2D containers may be defined to act together, as defined by the 3D constraints, modification of one 2D container may affect other 2D containers. Specifically, if a 2D container has been modified, the 3D constraints are applied (as discussed above). As long as the 3D constraints are met, the modification of the 2D container is allowed to be committed (i.e., the modifications are accepted) (ST 406).

Modification of a 2D container may also modify the GUI components within the 2D container. Specifically, if a 2D container is modified by the user or because of the 3D constraints, the 2D constraints are applied and the GUI components are modified (ST 408). After the 2D container and each GUI component within the 2D container have been modified as defined by the 2D and 3D constraints, a check is made to determine whether any 2D containers were affected (ST 410). If other 2D containers are affected, the other 2D containers are modified based on the 3D constraints (ST 412). As discussed above, if a 2D container is modified, the 2D constraints are applied and the GUI components are modified (ST 414).

To assist with implementing this invention, an Integrated Development environment (IDE) may be used. An Application Programming Interface (API) adapted to the IDE may supply functionality to place 2D containers into a 3D environment. The API may also supply the function to define the 3D constraints. A 2D/3D GUI Toolkit may also be included within the IDE to allow the programmer to choose the desired GUI components and 2D containers to build the 3D GUI. The 2D/3D Toolkit may provide a pre-defined 3D GUI, in which the 2D containers are already laid out and the 3D constraints are already defined. For example, the 2D/3D Toolkit could provide a box shape, in which the programmer can simply place the desired GUI components on each face of the box.

Advantages of the present invention include one or more of the following. The technique of placing objects into a 3D environment is made easier by using similar schemes that are commonly used for building a 2D GUI. In addition, this technique allows a programmer to determine the size, location, orientation, etc. of a 3D GUI prior to run-time. One skilled in the art will appreciate that the present invention may have additional advantages and features.

Figure 5:
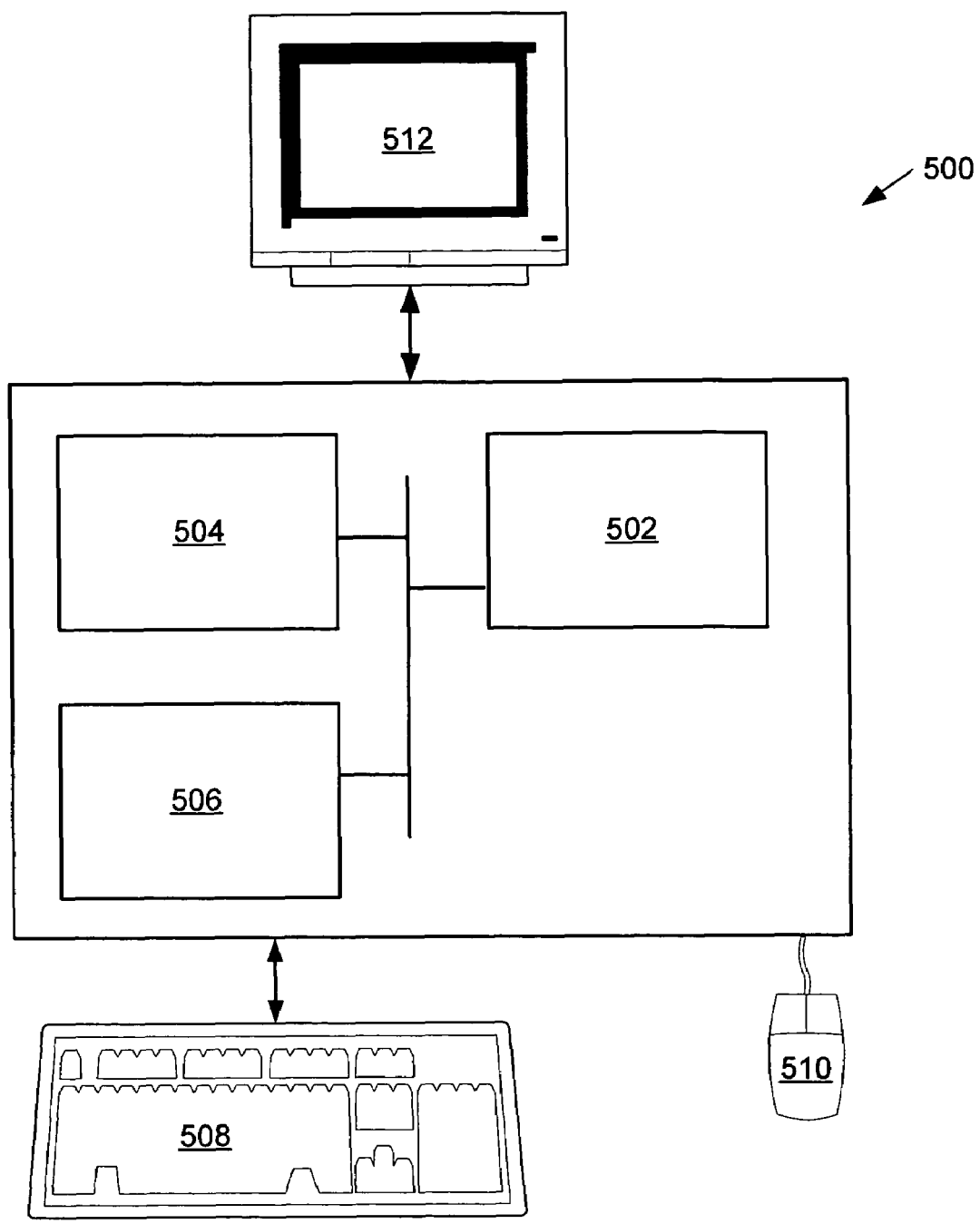
FIG. 5 illustrates a typical computer with components, in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Further, software instructions to perform embodiments of the invention may be stored on a computer readable medium such as a compact disc (CD), a diskette, a tape, a file, or any other computer readable storage device. A person of ordinary skill in the art will appreciate that these input and output means may take other forms.

While the invention has been described with respect to a limited number of embodiments, a person of ordinary skill in the art having benefit of this disclosure, will appreciate that other embodiments can be devised which do not depart from the scope of the invention as disclosed herein. Accordingly, the scope of the invention should be limited only by the attached claims.

What is claimed is:

1. A method for creating a three-dimensional (3D) graphical user interface (GUI) for a software program, comprising:
   creating a first two-dimensional (2D) container and a second 2D container;
   placing a first GUI component in the first 2D container;
   placing a second GUI component in the second 2D container;
   placing the first 2D container and the second 2D container in a 3D environment to create the 3D GUI, wherein the 3D GUI has a 3D shape, and wherein the first 2D container and the second 2D container are sides of the 3D shape; and
   specifying at least one selected from a group consisting of a 2D constraint for the first 2D container and a 3D constraint for the 3D GUI,
   wherein an orientation of the first 2D container in the 3D environment and an orientation of the second 2D container in the 3D environment are set prior to execution of the software program.

2. The method of claim 1, further comprising:
   modifying the first 2D container to obtain a modified first 2D container;
   determining whether the modified first 2D container satisfies the 3D constraint; and
   committing the modified first 2D container if the modified first 2D container satisfies the 3D constraint.

3. The method of claim 2, wherein committing the modified first 2D container comprises modifying the second 2D container using the 3D constraint.

4. The method of claim 1, further comprising:
modifying the first GUI component to obtain a first modified GUI component;
determining whether the first modified GUI component satisfies the 2D constraint; and
committing the first modified GUI component if the first modified GUI component satisfies the 2D constraint.

5. The method of claim 4, further comprising:
placing a third GUI component in the first 2D container, wherein the first GUI component is modified in response to a modification of the third GUI component.

6. The method of claim 4, wherein the first GUI component is modified in response to a modification of at least one selected from the group consisting of the 3D GUI and the first 2D container.

7. The method of claim 4, wherein committing the first modified GUI component comprises modifying the first 2D container using the 2D constraint.

8. The method of claim 1, wherein placing the first 2D container and the second 2D container in the 3D environment comprises orienting the first 2D container and the second 2D container in the 3D environment.

9. The method of claim 1, wherein placing the first 2D container and the second 2D container in the 3D environment comprises specifying locations of the first 2D container and the second 2D container using 3D coordinates.

10. The method of claim 9, wherein the 3D coordinates are expressed as 3D Cartesian coordinates.

11. A computer readable medium comprising software instructions to create a 3D GUI for a software program, wherein the software instructions comprise functionality to:
create a first 2D container and a second 2D container;
place a first GUI component in the first 2D container;
place a second GUI component in the second 2D container;
place the first 2D container and the second 2D container in a 3D environment to create the 3D GUI, wherein the 3D GUI has a 3D shape, and wherein the first 2D container and the second 2D container are sides of the 3D shape; and
specify at least one selected from a group consisting of a 2D constraint for the first 2D container and a 3D constraint for the 3D GUI,
wherein an orientation of the first 2D container in the 3D environment and an orientation of the second 2D container in the 3D environment are set prior to execution of the software program.

12. The computer readable medium of claim 11, further comprising software instructions with functionality to:
modify the first 2D container to obtain a modified first 2D container;
determine whether the modified first 2D container satisfies the 3D constraint; and
commit the modified first 2D container if the modified first 2D container satisfies the 3D constraint.

13. A computer system comprising:
a processor;
a memory;
a storage device; and
software instructions stored in the memory for enabling the computer system under control of the processor to:
create a first 2D container and a second 2D container,
place a first GUI component in the first 2D container,
place a second GUI component in the second 2D container,
place the first 2D container and the second 2D container in a 3D environment to create a 3D GUI for a software program wherein the 3D GUI has a 3D shape, and wherein the first 2D container and the second 2D container are sides of the 3D shape, and
specify at least one selected from a group consisting of a 2D constraint for the first 2D container and a 3D constraint for the 3D GUI,
wherein an orientation of the first 2D container in the 3D environment and an orientation of the second 2D container in the 3D environment are set prior to execution of the software program.

14. The computer system of claim 13, further comprising software instructions stored in the memory for enabling the computer system under control of the processor to:
modify the first 2D container to obtain a modified first 2D container;
determine whether the modified first 2D container satisfies the 3D constraint; and
commit the modified first 2D container if the modified first 2D container satisfies the 3D constraint.

15. The method of claim 1, wherein the first GUI component is at least one selected from a group consisting of a menu, a button, and a text box.

16. The computer readable medium of claim 11, wherein the first GUI component is at least one selected from a group consisting of a menu, a button, and a text box.

17. The computer system of claim 13, wherein the first GUI component is at least one selected front a group consisting of a menu, a button, and a text box.

18. The computer readable medium of claim 11, wherein the software instructions are associated with an Application Programming Interface (API).

19. The method of claim 1, wherein the first 2D container and the second 2D container have a shared edge in the 3D shape.

20. The method of claim 1, further comprising:
modifying the first 2D container; and
enforcing the 2D constraint by modifying the first GUI component in response to modifying the first 2D container.

21. The method of claim 20, wherein modifying the first 2D container comprises an operation selected from a group consisting of elongating, stretching, compressing, and rotating.

22. The method of claim 1, further comprising:
placing a third GUI component in the first 2D container;
modifying the first GUI component; and
enforcing the 2D constraint by modifying the third GUI component in response to modifying the first GUI component.

23. The method of claim 22, wherein modifying the first GUI component comprises an operation selected from a group consisting of elongating, stretching, compressing, and rotating.

24. The method of claim 1, further comprising:
modifying the first 2D container; and
enforcing the 3D constraint by modifying the second 2D container in response to modifying the first 2D container.

25. The method of claim 24, wherein modifying the first 2D container comprises an operation selected from a group consisting of elongating, stretching, compressing, and rotating.

* * * * *

UNITED STATES PATENT AND TRADEMARK OFFICE
CERTIFICATE OF CORRECTION

PATENT NO.         : 7,441,201 B1
APPLICATION NO.    : 10/968690
DATED              : October 21, 2008
INVENTOR(S)        : Antonios Printezis It is certified that error appears in the above-identified patent and that said Letters Patent is hereby corrected as shown below:

In Claim 17, Column 8 (line 31), please replace "front" with --from--.

Signed and Sealed this

Second Day of December, 2008

JON W. DUDAS
*Director of the United States Patent and Trademark Office*